United States Patent [19]

Abolins et al.

[11] Patent Number: 4,808,647
[45] Date of Patent: Feb. 28, 1989

[54] CROSSLINKABLE FLAME RETARDANT COMPOSITION OF POLYOLEFIN AND POLYPHENYLENE ETHER

[75] Inventors: Visvaldis Abolins, Delmar, N.Y.; Joseph E. Betts, Westport, Conn.; Fred F. Holub, Schenectady; Gim F. Lee, Jr., Albany, both of N.Y.

[73] Assignee: General Electric Company, Selkirk, N.Y.

[21] Appl. No.: 888,561

[22] Filed: Jul. 18, 1986

Related U.S. Application Data

[63] Continuation of Ser. No. 525,782, Aug. 23, 1983, abandoned.

[51] Int. Cl.$^4$ .......................... C08K 5/52; C08K 5/51; C08K 5/36
[52] U.S. Cl. ..................... 524/141; 524/142; 524/153; 524/282; 524/409; 524/508; 525/92; 525/132; 525/192; 525/332.5; 525/387
[58] Field of Search ............... 260/DIG. 24; 524/141, 524/142, 153, 282, 409, 508; 525/92, 132, 192, 332.5, 387

[56] References Cited

U.S. PATENT DOCUMENTS

| | | | |
|---|---|---|---|
| 3,639,506 | 2/1972 | Haaf | 524/141 |
| 3,661,877 | 5/1972 | Bluestein et al. | 525/387 |
| 3,859,395 | 1/1975 | Terhune et al. | 524/141 |
| 3,989,531 | 11/1976 | Orlando et al. | |
| 4,081,424 | 3/1978 | Gergen et al. | 525/92 |
| 4,134,927 | 1/1979 | Tomoshige et al. | |
| 4,166,055 | 8/1979 | Lee, Jr. | |
| 4,172,826 | 10/1979 | Haaf et al. | |
| 4,196,116 | 4/1986 | Haaf et al. | 525/68 |
| 4,239,673 | 12/1980 | Lee, Jr. | |
| 4,322,507 | 3/1982 | Haaf | 525/92 |
| 4,383,082 | 5/1983 | Lee, Jr. | 525/92 |
| 4,403,057 | 9/1983 | Yamashita et al. | 524/288 |
| 4,446,272 | 5/1984 | Fukuda et al. | |
| 4,497,925 | 2/1985 | Abolins et al. | 525/132 |

*Primary Examiner*—Kriellion Morgan
*Attorney, Agent, or Firm*—Hedman, Gibson, Costigan & Hoare

[57] ABSTRACT

Curable flame retardant mixtures of a polyolefin (non-rubbery), a polyphenylene ether resin, an aromatic phosphate, a brominated compound or polymer, and a crosslinking agent are described. Electrically conductive articles having insulation material made of the composition and methods for preparing such articles are also disclosed.

15 Claims, 1 Drawing Sheet

CROSSLINKABLE FLAME RETARDANT COMPOSITION OF POLYOLEFIN AND POLYPHENYLENE ETHER

This is a continuation of application Ser. No. 525,782, filed Aug. 23, 1983, now abandoned.

BACKGROUND OF THE INVENTION

The polyphenylene ether resins and methods for their preparation are known, and moreover, described in the patent literature, including U.S. Pat. Nos. 3,306,874 and 3,306,875 (Hay) and U.S. Pat. Nos. 3,257,357 and 2,257,358 (Stamatoff). The polyphenylene ether resins are also known to be combinable with other polymers to form compositions which are extrudable and moldable into products characterized by outstanding properties. Cizek, in U.S. Pat. No. 3,383,435 describes blends of polyphenylene ether resin and polystyrene. Lee, Jr. in U.S. Pat. Nos. 4,166,055 and 4,239,673 discloses blends of polyphenylene ether, polyolefin and styrene-butadiene block copolymer.

Heaf and Cooper, in U.S. Pat. No. 4,172,826, describe flame retardant thermoplastic compositions of a polyphenylene ether resin, a block copolymer and a styrene resin which have been modified by adding an EPDM rubber (that is, a rubbery terpolymer of ethylene, propylene and a diene monomer). As shown in the examples of the patent, the EPDM rubber is present in amounts equivalent to or less than the polyphenylene ether resin, and it functions primarily to confer better impact resistance in the polyphenylene ether resin.

The emphasis in many of these patents is on improving the properties of the polyphenylene ether resins and blends by modifying them with other polymers. The polyolefins themselves constitute an important family of industrial materials, however. For instance, olefinic polymers are now employed in formulations for insulation material in electrical wires and cables. Typically, however, they lack good flame resistance in the absence of special additives.

SUMMARY OF THE INVENTION

There have now been discovered new compositions of non-rubbery olefin polymers made flame retardant by the presence of a multi-component flame retardant agent comprising, in combination, a polyphenylene ether resin, an organic phosphate and a stable brominated material. The compositions also contain a small, effective amount of a crosslinking agent and will cure upon heating, or upon exposure to high energy radiation, for example, high energy electrons.

The compositions described here are characterized by good properties often associated with elastomeric compositions, being marked by tensile strengths often greater than 750 psi and by tensile elongations of greater than 75%, after crosslinking (curing).

This invention also concerns, in its other aspects, electrically conductive articles in which the above described composition has been cured by heating or irradiation to provide a layer of insulation, as well as methods for producing such articles. The articles optionally also contain an outer layer of a protective material, which can be a thermoplastic or thermosetting polymer, for example, polyvinyl chloride.

DESCRIPTION OF THE INVENTION

In general, the compositions of this invention comprise, in curable admixture:
(a) a crosslinkable non-rubbery olefinic polymer;
(b) a flame retardant combination of
 (i) a polyphenylene ether resin,
 (ii) an organic phosphate, and
 (iii) a stable brominated material; and
(c) a crosslinking agent.

The olefinic polymers contemplated for use as component (a) in the compositions of this invention are essentially non-elastomeric, non-rubbery, thermoplastic (that is, in the absence of a heat activated crosslinking agent) polymers usually containing at least some crystalline domains. In general, polymeric component (a), which can be a homopolymer or copolymer, is derived from one or more olefins having from 2 to 10 carbon atoms, that is, $C_2$ to $C_{10}$ olefins. Most preferred are polyethylene and polybutene, however.

Methods for their preparation are known. A useful reference is the Encyclopedia of Polymer Science and Technology, John Wiley and Sons, Inc. (1965–1969). The pertinent sections are set forth in volume 6, pages 275–286 and 332–338 (polyethylene homopolymers); volume 6, pages 338–347 (various ethylene copolymers); volume 11, pages 597–606 (polypropylene); volume 2, pages 759–761 (polybutylene); and volume 9, pages 440–449 (polymers derived from the higher olefins, such as 3-methyl-1-butene; 1-pentene; 4-methyl-1-pentene; and 1-hexene). These teachings are incorporated herein by reference.

Polyolefins derived from the lower olefins, especially, are readily available. Commercial processes for the production of polyethylene in particular include the use of high pressure by free radical initiation, medium pressure with transition metal oxide catalysts, and low and medium pressure processes with transition metal halides and alkyl aluminum compounds. Polyethylenes of still higher molecular weights may be produced by the well known Phillips process. Polypropylene is typically manufactured with the use of Ziegler type catalysts and an anionic reaction mechanism. Polyolefins derived from any of these sources may be used in the practice of the present invention.

Widely ranging amounts of component (a) are contemplated. Preferably, however, the compositions are formulated to contain this component in amounts of at least 20 parts by weight, based on 100 parts of the combined polymeric components in the composition.

Preferred for use as the polyphenylene ether resin, component (b) (i) of the flame retardant combination, are homopolymers and copolymers having units of the formula

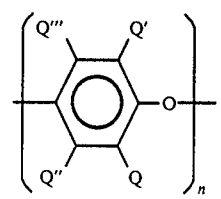

wherein Q, Q', Q" and Q"', are independently selected from the group consisting of hydrogen, halogen, hydrocarbon radicals, halohydrocarbon radicals, hydrocarbonoxy radicals, and halohydrocarbonoxy radicals; and n represents the total number of monomer units and is an integer at least about 20, and preferably at least 50.

In general, the polyphenylene ether resins are self-condensation products of monohydric monocyclic phenols produced by reacting the phenols with oxygen in the presence of complex metal catalysts, with molecular weight being controlled by reaction time, longer times providing a higher average number of repeating units. Particular procedures are known to those skilled in the art and are described in the patent literature, including U.S. Pat. Nos. 3,306,874 and 3,306,875 (to Allan Hay), and U.S. Pat. Nos. 3,257,357 and 3,257,358 (to Gelu Stamatoff).

Illustrative polymers which can be produced by such procedures and which are within the above general formula are: poly(2,6-dilauryl-1,4-phenylene) ether; poly(2,6-diphenyl-1,4-phenylene) ether; poly(2,6-dimethoxy-1,4-phenylene)ether; poly(2,6-diethoxy-1,4-phenylene)ether; poly(2-methoxy-6-ethoxy-1,4-phenylene) ether; poly(2-ethyl-6-stearyloxy-1,4-phenylene)ether; poly(2,6-dichloro-1,4-phenylene)ether; poly(2-methyl-6-phenyl-1,4-phenylene)ether; poly(2,6-dibenzyl-1,4-phenylene)ether; poly(2-ethoxy-1,4-phenylene)ether; poly(2-chloro-1,4-phenylene)ether; poly(2,6-dibromo-1,4-phenylene)ether; and the like.

Also included are polyphenylene ether copolymers, such as copolymers of 2,6-dimethylphenol with other phenols, for example, with 2,3,6-trimethylphenol or 2-methyl-6-butylphenol, etc.

For purposes of the present invention, an especially preferred family of polyphenylene ethers include those having an alkyl substitution in the two positions ortho to the oxygen ether atom, i.e., those of the above formula wherein Q and Q' are alkyl, most preferably having from 1 to 4 carbon atoms. Illustrative members of this class are: poly(2,6-dimethyl-1,4-phenylene)ether; poly(2,6-diethyl-1,4-phenylene)ether; poly(2-methyl-6-ethyl-1,4-phenylene)ether; poly(2-methyl-6-propyl-1,4-phenylene)ether; poly(2,6-dipropyl-1,4-phenylene)ether; poly(2-ethyl-6-propyl-1,4-phenylene)ether; and the like.

The most preferred polyphenylene ether resin for purposes of the present invention is poly (2,6-dimethyl-1,4-phenylene)ether.

The organic phosphate, component (b) (ii) of the flame retardant combination, is preferably an aromatic phosphate compound of the formula

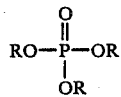

where R is the same or different and is alkyl, cycloalkyl, aryl, alkyl substituted aryl, halogen substituted aryl, aryl substituted alkyl, halogen, or a combination of any of the foregoing, provided at least one R is aryl.

Examples include phenyl bisdodecyl phosphate, phenylbisneopentyl phosphate, phenyl-bis (3,5,5'-trimethylhexyl) phospate), ethyldiphenyl phosphate, 2-ethyl-hexyldi(p-tolyl) phosphate, bis-(2-ethylhexyl) p-tolylphosphate, tritolyl phosphate, bis-(2-ethylhexyl) phenyl phosphate, tri-(nonylphenyl) phosphate, di (dodecyl) p-tolyl phosphate, tricresyl phosphate, triphenyl phosphate, dibutylphenyl phosphate, 2-chloroethyldiphenyl phosphate, p-tolyl bis (2,5,5'-trimethyl-hexyl)phosphate, 2-ethylhexyldiphenyl phosphate, and the like. The preferred phosphates are those in which each R is aryl. Especially preferred is triphenyl phosphate, which may be either unsubstituted or substituted, for example, isopropylated triphenyl phosphate.

Alternatively, the organic phosphate can be a di- or polyfunctional compound or polymer having the formula

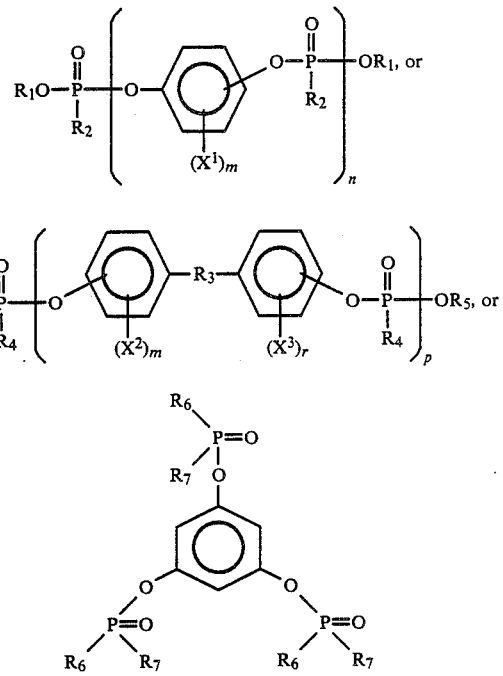

including mixtures thereof, in which $R_1$, $R_3$ and $R_5$ are, independently, hydrocarbon; $R_2$, $R_4$, $R_6$ and $R_7$ are, independently, hydrocarbon or hydrocarbonoxy; $X^1$, $X^2$ and $X^3$ are halogen; m and r are 0 or integers from 1 to 4, and n and p are from 1 to 30.

Examples include the bis diphenyl phosphates of resorcinol, hydroquinone and bisphenol-A, respectively, or their polymeric counterparts.

Methods for the preparation of the aforementioned di- and polyfunctional aromatic phosphates are described in British Pat. No. 2,043,083.

As explained, the composition also includes, as component (b) (iii), a stable brominated material, which can be a brominated compound, or oligomer, or polymer that is reasonably stable at elevated temperatures, particularly above 100° C. and, moreover, preferably is relatively nonvolatile at about 100° C.

In the preferred embodiments, component (b) (iii) is a bis phenoxy alkane compound of the formula

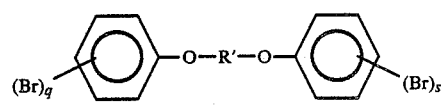

where R' is alkylene, straight or branched, having from 1 to 10 carbon atoms, and, more preferably, from 1 to about 6 carbon atoms; and q and s represent the total number of bromine atoms on each ring and are independently integers from 1 to 5.

Examples are 1,2-bis(2,4,6,-tribromophenoxy)ethane; 1,3-bis(2,4,6-tribromophenoxy)propane; 1,4-bis (2,4,6-tribromophenoxy)butane; and 2,2-bis(4-bromophenoxy) propane. Preferred are 1,2-bis(2,4,6-tribromophenoxy)ethane and 1,2-bis(2,3,4,5,6-pentabromophenoxy) ethane. A method of preparation is described in U.S. Pat. No. 4,016,138 (Anderson).

Also useful as component (b) (iii) are brominated flame retardant polymers and oligomers, including those which are described in U.S. Pat. No. 3,334,154 (Kim) and U.S. Pat. No. 3,833,685 (Wambach). For example, these can be aromatic carbonate copolymers having units of the formula

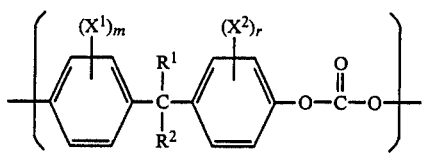

in which $R^1$ and $R^2$ are hydrogen, (lower) alkyl or phenyl, $X^1$ and $X^2$ are bromo or chloro, and m and r are from 1 to 4, and units of the formula:

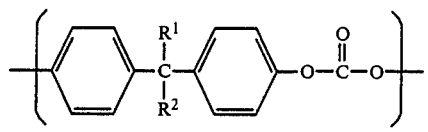

in which $R^1$ and $R^2$ are as defined above.

Especially preferred, however, are oligomeric tetrabromobisphenol-A polycarbonates.

The flame retardant combination is present in at least the minimum amount necessary to impart a degree of flame retardancy to the composition. The particular amount will vary, depending on the amount of the polyolefin present and possibly other normally flammable ingredients which might also be included in the composition. Each of the three components which make up the flame retardant combination will generally be added in an amount within the following preferred ranges:

Polyphenylene ether resin, (b) (i) 5 to 70 parts
Organic phosphate, (b) (ii) 1 to 30 parts
Brominated material, (b) (iii) 1 to 50 parts based on 100 parts by weight of (a) and (b) (i) together.

The composition is also modified to the thermosetting, that is, heat curable, or radiation curable by including one or more compounds effective to cause crosslinking of the polyolefin when the composition is exposed to an elevated temperature, for example, about 300° F. or higher, or to high energy radiation, for a relatively brief period of time. Preferably, the crosslinking agent, component (c), has a low volatility at the temperature employed for processing, as well as good stability in the presence of the other ingredients of the composition. Special mention is made of organic peroxides, e.g., dicumyl peroxide; 2,5-dimethyl-2,5-di(tertbutylperoxy)hexane; 2,2-bis(t-butylperoxy)-diisopropyl benzene; ethyl 3,3-bis (t-butylperoxy)butyrate; n-butyl-4,4-bis(4-butylperoxy)valerate; and 2,5-dimethyl-2,5-di(t-butylperoxy) hexane-3. Amounts of from about 1.5 to about 10 parts of the crosslinking agent, for each 100 parts of (a) and (b)(i) combined, are generally sufficient to provide the desired crosslinking.

The composition can be further modified, if desired, by including one or more additives often used with thermoplastic polymers, some of which may serve to beneficially affect the chemical and physical properties. Examples are mineral fillers, including clay, reinforcing agents, for example, glass fibers, flakes or spheres, plasticizers, stabilizers, antioxidants, colorants, processing aids, and so forth.

Particular mention is made of polymeric materials having elastomeric or elastomeric-like properties. They may be, for instance, copolymers and terpolymers of styrene, such as styrene-butadiene copolymers and styrene-butadiene-styrene terpolymers, as well as hydrogenated derivatives of any of the foregoing. Such materials will be added in amounts ranging from 1 to 50 parts by weight, or more, for each 100 parts of (a) and (b) (i) together, which may help to upgrade the compatibility of components (a) and (b) (i).

Optionally, and desirably, a synergistic enhancer for component (b) (iii) can be included to increase the flame retardancy still further. This ingredient is selected from compounds known to synergistically improve the flame resistance imparting properties of brominated agents, and generally such compounds are based on antimony and/or molybdenum. Especially favored for use in the present invention is antimony oxide, usually in amounts of from about 1 to 10 parts by weight for each 100 parts of (a) and (b) (i), but other antimony compounds and amounts are possible depending on particular requirements, and these will be known to those skilled in the art.

The composition may be processed for use by milling a mixture of the ingredients at an elevated temperature and extruding, molding, sheeting, or otherwise working into the desired form.

A particular application involves the use of the composition in the manufacture of insulation material for electrically conductive articles, for example, copper or aluminum wires and cables. A method of use comprises providing the described composition and applying it to the surface of an electrically conductive metal article; thermosetting or radiation curing can take place before application or in situ on the metal article. The insulated article thus formed can additionally comprise an outer protective coating which can be made of a thermoplastic or thermosetting polymer, e.g., polyvinyl chloride. Exemplary products are shown in the accompanying drawings, which are described below.

DESCRIPTION OF THE SPECIFIC EMBODIMENTS

Figure 1:
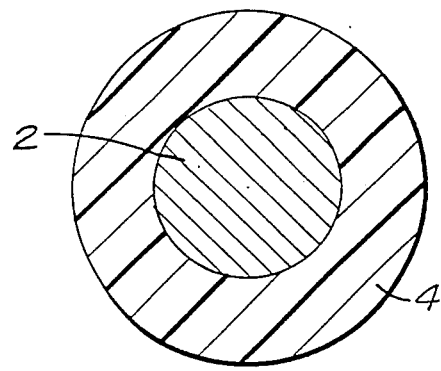
FIG. 1 illustrates an electrically conductive article in accordance with the invention, in cross-section comprising copper wire 2, and insulation layer 4, consisting of a flame retardant composition as described above.
Figure 2:
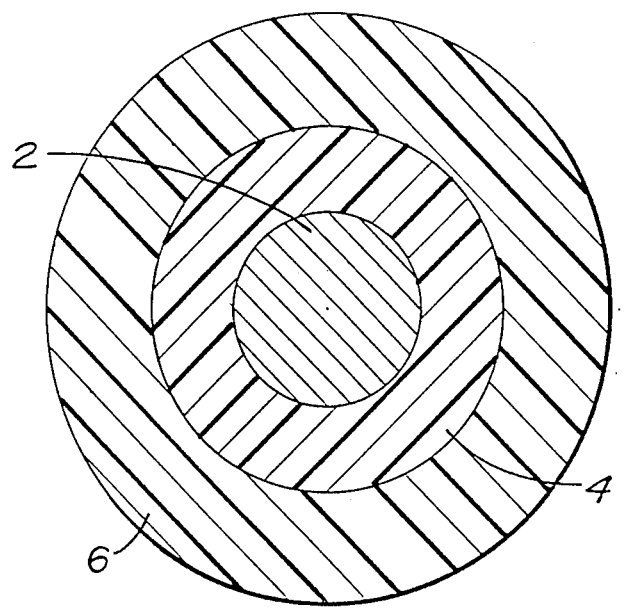
FIG. 2 illustrates a modified embodiment, also in cross-section, comprising copper wire 2, flame retardant insulation layer 4, and outer protective polymeric coating 6.

The invention is illustrated in the following examples, which are intended to show merely some of the embodiments possible. All amounts are stated in parts by weight.

Examples 1-3

Compositions in accordance with the invention were prepared by milling the ingredients noted below on a two roll mill at 290° to 300° F., then press curing between heated platens at 360° F. for 45 minutes, to give the properties shown.

TABLE 1

| INGREDIENTS | 1 | 2 | 3 |
|---|---|---|---|
| Low density polyethylene | 50 | 50 | 34 |
| Strene-ethylene/butylene-styrene block copolymer | 20 | 25 | 33 |
| Poly (2,6-dimethyl-1,4-phenylene) ether resin | 30 | 25 | 33 |
| Isopropylated triphenyl phosphate | 10 | 10 | 10 |
| Bis(2,4,6-tribromophenoxy)ethane | 4 | 4 | 4 |
| Antioxidant | | | |
| α,α'-bis(t-butylperoxy)-diisopropyl benzene | 2 | 2 | 2 |
| PROPERTIES | | | |
| Tensile strength, psi | 955 | 1065 | 930 |
| Elongation, % | 100 | 110 | 80 |
| Vertical Burn Test, ⅛ inch specimen | | | |
| Drip Characteristics | ND,ND | ND,ND | ND,ND |
| Seconds to quench | | | |
| 1st ignition | 0,0 | 0,1 | 0,0 |
| 2nd ignition | 2,4 | 4,6 | 1,2 |

ND = No Drip

Example 4

The composition shown below was prepared by extruding the ingredients through a twin screw extruder at 500° to 600° F., followed by milling at 290° to 300° F., then press curing between platens at 360° F. for 45 minutes. The results are reported in the Table.

TABLE 2

| | 4 |
|---|---|
| INGREDIENTS | |
| Polyethylene, low density | 50 |
| Poly(2,6-dimethyl-1,4-phenylene)ether resin | 25 |
| Styrene-butylene/ethylene-styrene block copolymer | 16.7 |
| Isopropylated triphenyl phosphate | 8.3 |
| Bis(2,4,6-tribromophenoxy)ethane | 4 |
| Antioxidant | 1 |
| α,α'-bis(t-butylperoxy)-diisopropyl benzene crosslinking agent | 2 |
| PROPERTIES | |
| Tensile strength, psi | 1370 |
| Elongation, % | 250 |
| Vertical Burn Test, ⅛ inch specimen | |
| Drip characteristics | ND,ND |
| Seconds to quench: | |
| 1st ignition | 1,2 |
| 2nd ignition | 9,7 |

ND = No Drip

EXAMPLES 5–6

The ingredients listed below were extruded at 500° to 600° F., followed by milling at 270° to 280° F. for 5 and at 310° to 320° F. for 6, and then press cured at 360° F. for 45 minutes in both cases.

TABLE 3

| | 5 | 6 |
|---|---|---|
| INGREDIENTS | | |
| Low density polyethylene | 50 | — |
| High density polyethylene | — | 50 |
| Poly(2,6-dimethyl-1,4-phenylene) ether resin | 30 | 30 |
| Styrene-ethylene/butylene-styrene block copolymer | 20 | 20 |
| Isopropylated triphenyl phosphate | 10 | 10 |
| Antioxidant | 1 | 1 |
| Bis(2,4,6-tribromophenoxy)ethane | 4 | 4 |

TABLE 3-continued

| | 5 | 6 |
|---|---|---|
| α,α'-bis(t-butylperoxy)-diisopropyl benzene crosslinking agent | 2 | 2 |
| PROPERTIES | | |
| Tensile strength, psi | 1300 | 1680 |
| Elongation, % | 240 | 210 |
| Vertical Burn Test, ⅛ inch | | |
| Drip characteristics | ND,ND | ND,ND |
| Seconds to quench: | | |
| 1st ignition | 1,0 | 0,0 |
| 2nd ignition | 0,1 | 6,8 |

ND = No Drip

Example 7

The composition was prepared by milling all of the ingredients, except crosslinking agent, at 380° to 390° F., followed by milling again but at 320° to 330° F. With the addition of the crosslinking agent, and finally, molding at 370° F. for 30 minutes to effect cure.

TABLE 4

| INGREDIENTS | |
|---|---|
| Polybutene | 50 |
| Poly(2,6-dimethyl-1,4-phenylene ether) resin | 40 |
| Styrene-ethylene/butylene-styrene block copolymer | 10 |
| Isopropylated triphenyl phosphate | 10 |
| Tetrabromobisphenol-A oligomeric polycarbonate | 30 |
| Bis diphenyl phosphate of resorcinol | 10 |
| Antimony oxide | 5 |
| α,α'-bis(t-butylperoxy)-diisopropyl benzene crosslinking agent | 3 |
| PROPERTIES | |
| Horizontal propagation, in inches after 30 seconds | ⅛ |
| Horizontal Burn Test, ⅛ inch specimen | ND |
| Vertical Burn Test, ⅛ inch specimen: | |
| Drip characteristics | ND,ND |
| Seconds to quench: | |
| 1st ignition | 12,12 |
| 2nd ignition | 0,1 |

ND = No Drip

All of the above mentioned patents and publications are incorporated herein by reference.

Other modifications and variations of the invention are possible and will occur to those skilled in the art in light of the above disclosure. It is to be understood, therefore, that changes may be made in the particular embodiments shown without departing from the spirit of the invention or its scope as defined in the appended claims.

We claim:

1. A heat or radiation curable flame retardant composition, comprising an admixture of
   (a) at least 20 parts by weight of a nonrubbery crosslinkable olefinic polymer based on 100 parts of the combined polymers in the composition;
   (b) a flame retardant combination consisting of
      (i) at least 5 parts of a polyphenylene ether resin based on 100 parts of (a) and (b) (i) combined,
      (ii) an organic phosphate compound having the formula

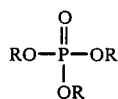

where R is the same or different and is alkyl, cycloalkyl, aryl, alkyl substituted aryl, halogen substituted aryl, aryl substituted alkyl, halogen, or a combination of any of the foregoing, provided at least one R is aryl, and (iii) a stable brominated material consisting essentially of a tetrabromobisphenol A oligomeric polycarbonate alone or in combination with a synergist which enhances the flame retardancy of (b) (iii); and (c) an effective amount of a crosslinking agent, and wherein component (a) is present in an amount greater than component (b) (i).

2. A composition according to claim 1, in which (a) is a $C_2$ to $C_{10}$ olefin homopolymer or copolymer.

3. A composition according to claim 1, in which (a) is polyethylene.

4. A composition according to claim 1, in which (a) is polybutene.

5. A composition according to claim 1, in which (b) (i) is a homopolymer or copolymer having units of the formula

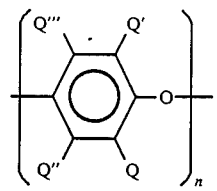

wherein Q, Q', Q" and Q"', are independently selected from the group consisting of hydrogen, halogen, hydrocarbon radicals, halohydrocarbon radicals, hydroxycarbonoxy radicals, and halohydrocarbonoxy radicals; and n represents the total number of monomer units and is an integer at least about 20.

6. A composition according to claim 1, in which (b) (i) is poly (2,6-dimethyl-1,4-phenylene ether).

7. A composition according to claim 1, in which component (b) (ii) is triphenyl phosphate.

8. A composition according to claim 1, in which the triphenyl phosphate is isopropylated.

9. A composition according to claim 1, in which the synergistic agent is an antimony compound.

10. A composition according to claim 9, in which the antimony compound is antimony oxide.

11. A composition according to claim 1, in which (c) is an organic peroxide.

12. A composition according to claim 11, in which the organic peroxide is 2,2'-bis(tert-butyl peroxy)-diisopropyl benzene.

13. A composition according to claim 1, which includes an additional polymer having elastomeric properties.

14. A composition according to claim 13, in which the polymer is a styrene-ethylene/butylene-styrene block copolymer.

15. A composition according to claim 1 wherein (a) is prepared in an amount of at least 34 parts by weight and (b) (i) is present in an amount of at least 25 parts by weight.

* * * * *

UNITED STATES PATENT AND TRADEMARK OFFICE
CERTIFICATE OF CORRECTION

PATENT NO. : 4,808,647

DATED : February 28, 1989

INVENTOR(S) : Visvaldis Abolins et al

It is certified that error appears in the above-identified patent and that said Letters Patent is hereby corrected as shown below:

Claim 8, line 1, "1" should read --7--.

Claim 15, line 2, "prepared" should read --present--.

Signed and Sealed this

Twenty-seventh Day of March, 1990

Attest:

JEFFREY M. SAMUELS

*Attesting Officer*  Acting Commissioner of Patents and Trademarks